United States Patent [19]

Wood

[11] Patent Number: 4,725,160

[45] Date of Patent: Feb. 16, 1988

[54] MOUNTING FOR A WHEELCHAIR SERVICE TRAY

[76] Inventor: Charles F. Wood, 8341 West Foothill Dr., Peoria, Ariz. 85345

[21] Appl. No.: 6,896

[22] Filed: Jan. 27, 1987

Related U.S. Application Data

[62] Division of Ser. No. 863.048, May 14, 1986, Pat. No. 4,679,756.

[51] Int. Cl.⁴ .............................................. F16C 11/00

[52] U.S. Cl. ...................................... 403/95; 403/374; 248/411

[58] Field of Search ............. 403/92, 95, 110, DIG. 8, 403/374, 104; 248/411, 231.3

[56] References Cited

U.S. PATENT DOCUMENTS

| | | | |
|---|---|---|---|
| 476,721 | 6/1892 | Baldwin | 403/110 X |
| 1,664,835 | 4/1928 | Stevens | 108/142 |
| 2,741,255 | 4/1956 | Neptune | 403/374 X |
| 3,724,885 | 4/1973 | Becker | 403/104 |
| 4,332,363 | 6/1982 | Ware | 248/327 X |

FOREIGN PATENT DOCUMENTS

| | | | |
|---|---|---|---|
| 117294 | 9/1946 | Sweden | 297/172 |

*Primary Examiner*—Andrew V. Kundrat

*Attorney, Agent, or Firm*—Cahill, Sutton & Thomas

[57] ABSTRACT

An upright, detachably attachable to the frame of a wheelchair, supports a vertically adjustable mounting for a service tray. The mounting includes a quick release cam for precisely locating and pivoting the service tray into and out of a position of use.

7 Claims, 6 Drawing Figures

MOUNTING FOR A WHEELCHAIR SERVICE TRAY

This is a division of application Ser. No. 863,048, filed May 14, 1986, now U.S. Pat. No. 4,679,756.

The present invention relates to mountings and, more particularly, to mountings for locating vertically and pivotally a service tray with respect to a user.

Those persons who, due to illness of physical infirmities, are confined to a bed, wheelchair or the like, must generally resort to makeshift devices to be used in the manner of a table. For bed ridden persons there are commercially available devices which have a tray supported by pedestals at opposed ends. Such a device is used by placing it across the bed ridden person's thighs whereby the tray is supported by the pedestals resting on the bed. This device limits the movement of the user in order to maintain the tray stable; generally the user must have help in retrieving it from and returning it to a place of storage. There are also available floor stand mounted trays which require that the floor stand be placed close to the edge of the bed in order for the tray to be usable. The tray may or may not be pivotable about the floor stand and vertical adjustment of the tray may or may not be available.

To obtain a tray or planar surface for use by a person confined by a wheelchair, a board, tray or the like may be placed across the wheelchair arm rests. Such a board or tray easily slides off the arm rests, has no capability for vertical adjustment and requires retrieval from and return to a place of storage. To overcome or resist an unintentioned mobility of a board or tray, clip like attachments have been used to secure the board or tray in place. Release of these clip like attachments may or may not be readily negotiated by the user depending upon his/her degree of manual dexterity. Persons confined for periods of time to a chair having arm rests are subjected to the same problems and ackward to negotiate solutions in order to have the benefit of a planar working surface while seated in the chair.

It is therefore a primary object of the present invention to provide a mounting for a service tray which provides vertical adjustment and pivotal repositioning of the service tray.

Another object of the present invention is to provide a mounting for a service tray which is detachably attachable to any of a plurality of articles of furniture wherein a user may be seated.

Yet another object of the present invention is to provide apparatus for detachable attaching to a tubular member of a piece of furniture a mounting for a service tray.

Still another object of the present invention is to provide a mounting for a service tray which can be brought into a position of use by a user having a limited range of manual dexterity.

A further object of the present invention is to provide a cam mechanism for accurately pivoting a service tray into use, locking it into place and affording a quick release for pivoting the service tray away from the user.

A yet further object of the present invention is to provide a cam mechanism for pivotally mounting a service tray which is lockable against movement in either direction.

A still further object of the present invention is to provide a noiseless cam mechanism for use in a mounting for a pivotally movable service tray.

These and other objects of the present invention will become apparent to those skilled in the art as the description thereof proceeds.

The present invention may be described with greater specificity and clarity with reference to the following drawings in which.

Figure 1:
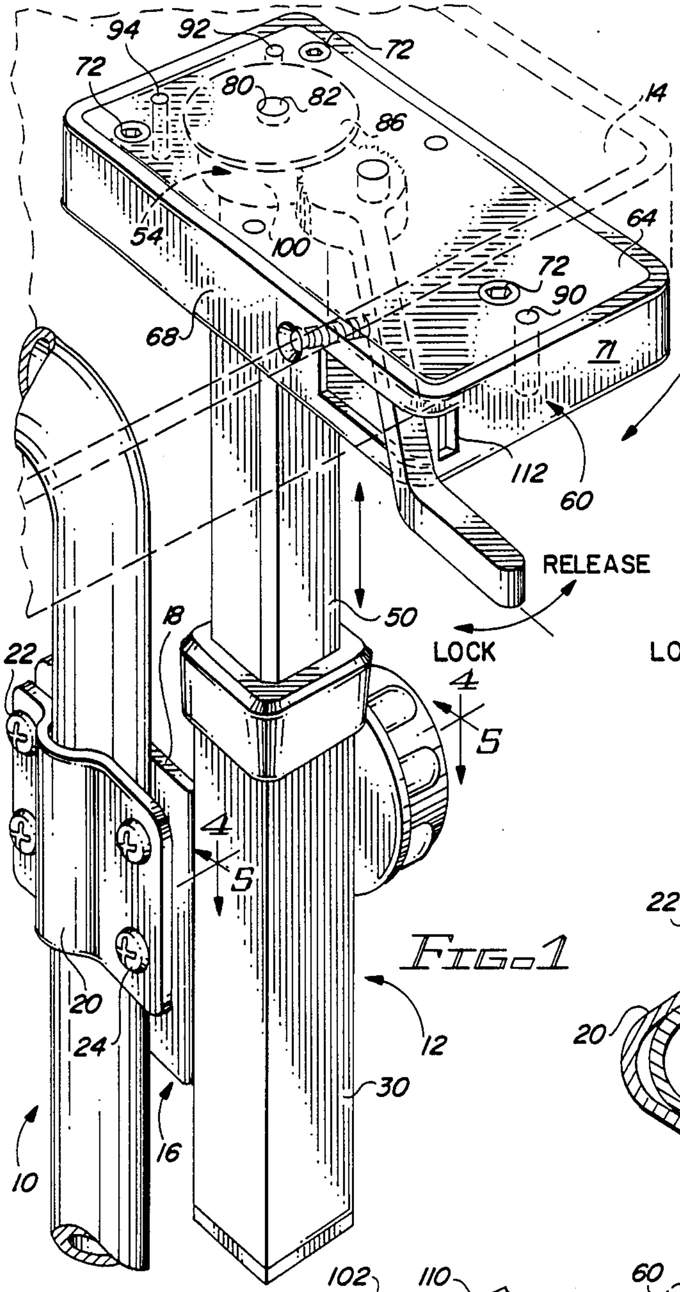
FIG. 1 is a perspective view of the present invention detachably attachable to a vertical support of a piece of furniture.

Hospital beds, wheelchairs and other institutional furniture for supporting a person in a seated position generally include vertical tubular members as part of the frame. Such a member, formed as part of an arm rest of a wheelchair, is depicted in FIG. 1 and identified by numeral 10. A mounting 12 for supporting a service tray 14 is detachably attached to member 10 by attachment means 16. It is to be understood that tray 14 may have a simple planar surface, that it may include a peripheral ridge, or that it may have identations or protrusions intended for a specific activity, use or apparatus to be placed thereon. The attachment means includes a backing plate 18 and a channelled plate 20 for for receiving member 10 therebetween. The backing plate and the channelled plate are secured by securing means 22; the securing means may be nut and bolt means or threaded screw 24 engaging a commensurately located threaded hole in backing plate 18.

Figure 4:
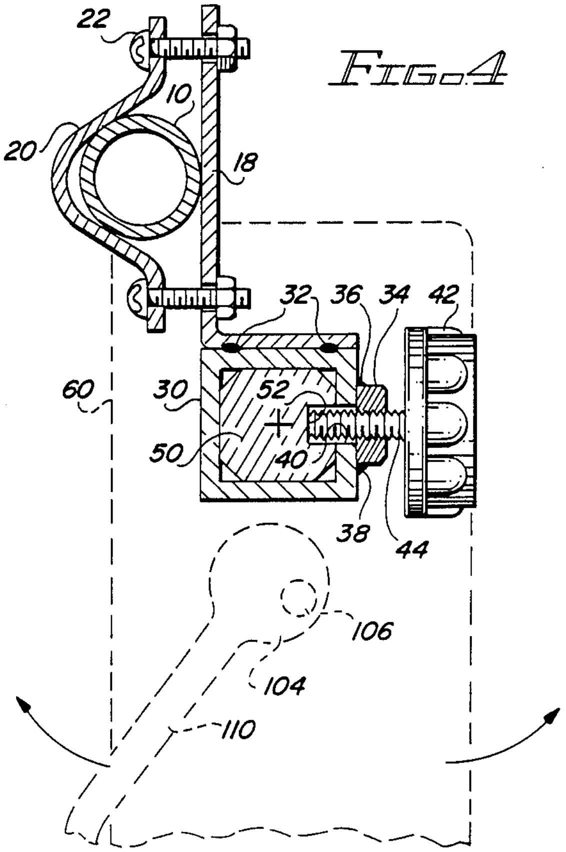
FIG. 4 is a partial cross sectional view taken along lines 4—4, as shown in FIG. 1.

A length of hollow tubing 30 is welded by welds 32, as illustrated in FIG. 4, or is otherwise secured to backing plate 18. A nut 34 is welded by welds 36 to tubing 30 coincident with aperture 38 in wall 40 of the tubing. A hand wheel 42 includes a threaded shaft 44 for threadedly engaging nut 34. It is to be understood that other threaded means may be incorporated for engaging shaft 44. A stanchion 50 slidably engages the interior of tubing 30 and includes a channel 52 for receiving the end of shaft 44. By manually turning hand wheel 42, shaft 44 is brought into and out of frictional engagement with channel 52 to positionally lock stanchion 50 with respect to tubing 30. Thereby, vertical adjustment of tray 14 of mounting 12 may be accomplished.

Figure 5:
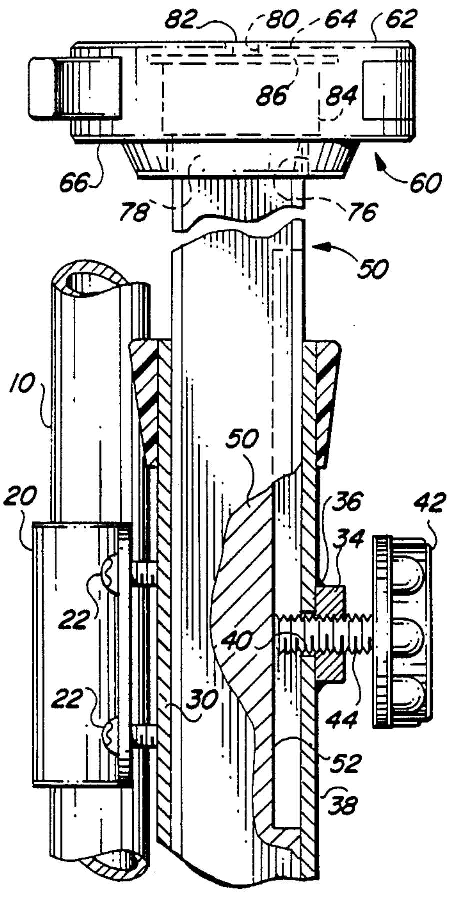
FIG. 5 is a side view taken along lines 5—5 as shown in FIG. 1.

Referring jointly to FIGS. 1 and 5, the support for tray 14 upon stanchion 50 will be described. The upper end of the stanchion includes a head 54 for supporting without relative vertical movement a cam unit 60 while permitting relative pivotal movement in a horizontal axis therebetween. The cam unit includes a relatively large upper surface 62 of cover 64 for supporting and to which is rigidly secured tray 14. The stanchion, the cam unit and the interfacing elements thereof are of relatively robust and strong construction to prevent tilting of tray 14 without impeding pivotal movement of the tray and cam unit about the stanchion.

Figure 2:
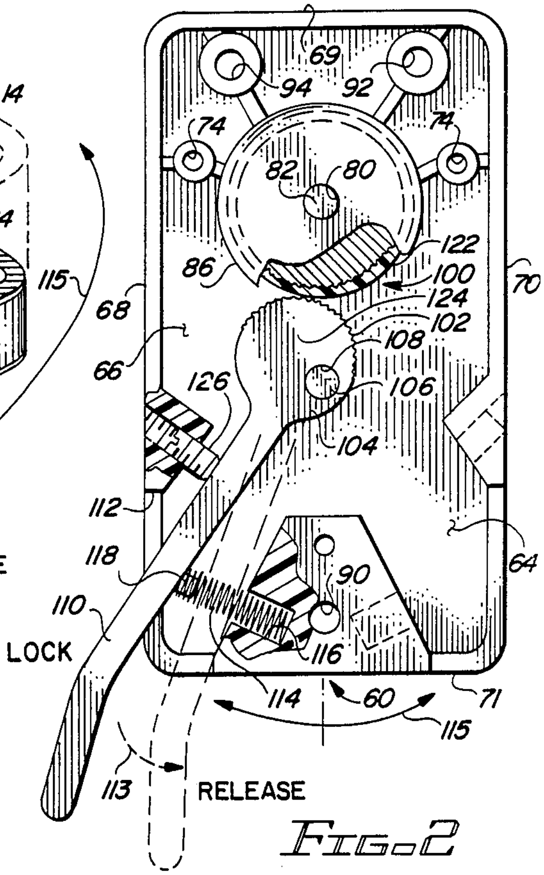
FIG. 2 is a top view of the cam mechanism used in the mounting shown in FIG. 1.

Referring jointly to FIGS. 1, 2 and 5, the construction of cam unit 60 will be described. The cam unit includes a box having a bottom 66 and four side walls 68, 69, 70 and 71 extending upwardly therefrom. Cover 64 is secured within the sidewalls to form planar upper surface 62 therewith by attachment means 72 extending from the cover to receiving cavities 74 in bottom 66. Bottom 66 includes an aperture 76 dimensioned to rotationally engage circular annular band 78 of stanchion 50. Cover 64 includes an aperture 80 for receiving shaft 82 extending from the top center of stanchion 50. Downward movement of the stanchion relative to bottom 66 is precluded by expanded annular portion 84 of the stanchion; upward movement of the stanchion relative to cover 64 is precluded by circular surface 86. Thereby, bottom 66 and cover 64 serve to lockingly engage and journal the cam unit with respect to stanchion 50. Cam unit 60 includes passageways 90, 20 and 94 extending therethrough for penetrably receiving further securing means (not shown) for robustly securing table 14 to the unit.

Figure 3:
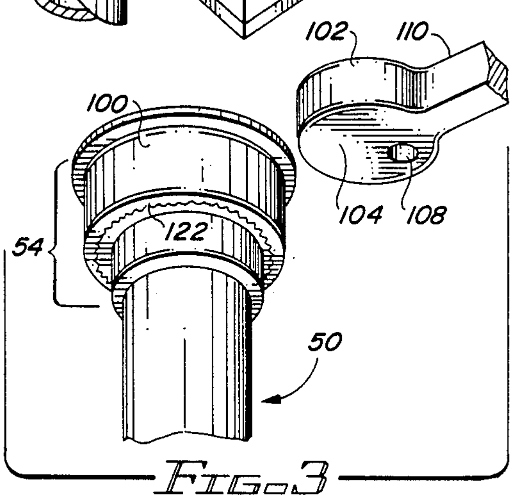
FIG. 3 is an exploded view of the cam surfaces shown in FIG. 2.

Referring jointly to FIGS. 1, 2 and 3, the operation of cam unit 60 will be described in detail. Stanchion 50 includes a cylindrical surface 100, as part of head 54 and forming expanded annular portion 84, for engagement with curved surface 102 of cam 104. The cam is pivotally supported off center of the lows of curved surface 102 by a pivot pin 106 extending from bottom 66 and engaging aperture 108. An arm 110 of cam 104 extends external of cam unit 60 through slot 112 formed in sidewalls 68 and 71. On pivotal movement of arm 110 to the right, as indicated by arrow 113 in FIG. 2, curved suface 102 will disengage from cylindrical surface 100. Thereafter, the cam unit is free to rotate about stanchion 50, as indicated by arrow 115 in FIGS. 1 and 2. A spring 114 extends from a cavity 116 formed as part of bottom 66 for engagement with protrusion 118 extending from arm 110. Thereby, spring 114 biases the arm, and hence curved surface 102, against cylindrical surface 100. An attempt to rotate cam unit 60 clockwise, as depicted in FIGS. 1 and 2, will be resisted by curved surface 102 being forced into cylindrical surface 100. To prevent destructive results from such interference, an adjustable stop 126 extends from side wall 68 to limit the angular excursion of arm 110 in the clockwise direction. It is to be understood that the position of stop 126 must be selected commensurate with the maximum degree of friction/pressure to occur between curved surface 102 and cylindrical surface 100.

In a prior art version of the present invention, cylindrical surface 100 included vertical serrations for interleavened contact with similar serrations upon curved surface 102. The combined locking force capable from such mechanical interference was great and far greater than necessary for use of cam unit 60 in the environment illustrated in FIG. 1. Furthermore, rotation of tray 14 about stanchion 50 when positioning the tray into a position of use, caused an undesirable noise level due to travel of the serrated surface of cam 102 over the serrations in cylindrical surface 100. In the embodiment illustrated in FIGS. 2 and 3, a sleeve 122 of hard polyurethane plastic material having a durometer hardness in a range of 100 to 120 is shown in place about head 54. This plastic sleeve, or it's equivalent, produces no undesirable level of noise when tray 14 is pivoted into position of use even if cam 104 includes serrations 124. Damage to the sleeve from a cutting or a brading action of the serrations can be avoided by limiting, through adjustment of stop 126, the excursion of the serrations into the sleeve. Yet, the frictional lock afforded by the structure illustrated in FIGS. 2 and 13 is more than sufficient to maintain tray 14 in place during more normal uses. To further minimize the possibility of permanent deformation or cutting of sleeve 122, curved surface 102 of cam 104 may be coated with a plastic coating having a durometer hardness in the range of 100 to 120. It is to be noted that a greater part of head 54 than sleeve 122 may be of plastic material; furthermore, all of stanchion 50 may be of plastic material.

Referring to FIG. 3, there is illustrated a variant of head 54 of stanchion 50. In certain applications, it may be preferable to employ circular tubing instead of the square tubing depicted in FIGS. 1 and 2. When such circular tubing is employed stanchion 50 must also be cylindrical as depicted in FIG. 3, to slidably engage and be supported by the circular tubing. The channel in the stanchion and manual locking thereof with respect to the tubing, as illustrated in FIG. 4, would also be employed.

In operation, on manipulation of arm 110 in a clockwise direction, as shown in FIG. 1, cam 104 will be brought out of engagement with head 54 of stanchion 50. Thereafter, tray 14 may be rotated at will in either direction about the axis of the stanchion. On release of arm 110, spring 114 will urge the arm in a clockwise direction to bring cam 104 into engagement with cylindrical surface 110 to prevent counterclockwise movement of tray 14 about the stanchion; yet, a user can pull the tray toward him/her (clockwise) to a position compatable with the use intended. To preclude inadvertent rotation of the tray, a fixed or adjustable brake may be incorporated to restrain such rotation. Vertical adjustment of the tray may be easily effected by rotating hand wheel 42 counterclockwise to disengage threaded shaft 44 with channel 52 of stanchion 50 and raising or lowering the tray to the extent desired and accomodated by the length of the channel. Thereafter, turning the hand wheel in a clockwise direction will lock the stanchion relative to tubing 30 and locate tray 14 in its new vertical position. It may be noted that vertical repositioning of the tray is independent of the pivotal position of the tray; and, likewise, the pivotal position of the tray is independent of the vertical movement of the tray, except to the extent that member 10 or other peripheral elements may impede pivoting or vertical movement of the tray.

Figure 6:
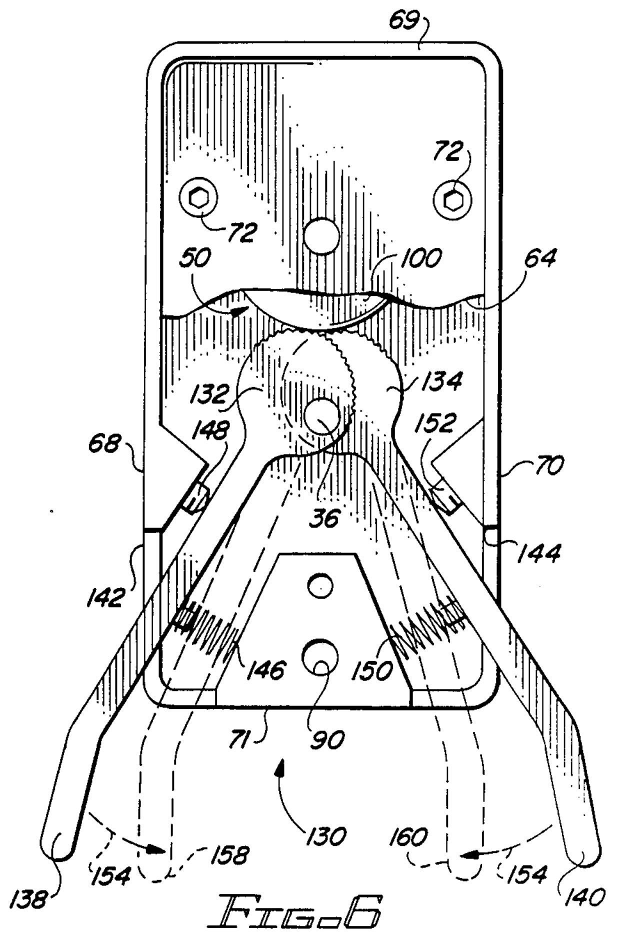
FIG. 6 illustrates a dual cam mechanism usable in the mounting shown in FIG. 1.

Referring to FIG. 6, there is shown a variant 130 of cam unit 60. Herein, two cams, 132, 134 are mounted on a common pin 136. Each of arms 138, 140 extend from their respective cams through slots 142, 144, respectively, in sidewalls 68, 70 and 71. Spring means 146 biases arm 138 in the clockwise direction and an adjustable stop 148 limits such movement. Similar spring means 146 biases arm 140 into a counterclockwise movement with the limit thereof being dictated by an adjustable stop 152. Each of cams 132, 134 is engagable with cylindrical surface 100 of stanchion 50. As full force engagement of the body, but not the face, of each cam can be machined away or otherwise removed to permit overlap of the cams without increasing the total thickness of the dual cams. Necessarily, the junction between the full width faces would correspond with the position of the cams at the point of maximum pressure engagement with the stanchion.

In operation, upon repositioning both arms 138, 140 toward one another, as indicated by arrows 154, 156, cam unit 130 is released from locking engagement with stanchion 50.

Thereafter, the cam unit and attached tray are free to pivot about the stanchion. On movement of only one of arms 138 or 140, to the position indicated by the respective one of dashed lines, 158, 160, pivotal movement of cam unit 130 will be precluded in one direction. For example, repositioning of arm 138 will permit clockwise movement of cam unit 130 with respect to the stanchion but the force exerted by cam 134 will inhibit counter-clockwise movement of the cam unit. It may be noted that the superimposition of cam 132, and 134 may be accomplished within cam unit 130 without altering the size of the cam unit from that of cam unit 60 if the thickness of cams 132 and 134 is half that of cam 104. Accordingly, dam unit 60 may be adapted to the configuration of variant 130 by replacing cam 104 and its respective arm 110 with cam 132 and its arm 138 and adding a further cam 134 with it's arm 140 along with spring means 140 and stop 152.

While FIGS. 1, 4 and 5 depict the mounting illustrated primarily in FIG. 1 as being attachable to a vertical member 10, it is to be understood that attachment to a non-vertical member may be readily effected. To afford such attachment, relatively minor angular and/or adjustable means may be incorporated in or formed as part of attachment means 16. Moreover, the mounting described herein is usable not only to support a tray 14 but also for the purpose of supporting any number of other items with which it is useful to have rectilinear movement in one direction and pivotal movement in a plane perpendicular to the axis of the rectilinear movement.

From the above review of the structure and operation of the present invention; it will become readily apparent that little manual dexterity is required to operate the present invention to obtain full benefit. That is, the arm of the cam can easily be pivoted to exert a force thereagainst without the need to grasp the arm. Thus, by relocating the cam arm, the tray can easily be moved toward the user. To move the tray out of the position of use, a force anywhere therealong can be exerted to pull or push the tray away from the user. This arrangement will also preclude creep of the tray toward the user. Vertical adjustment is easily effected by rotating the hand wheel, or alternatively a crank, and raising or lowering the tray to a new vertical position.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A cam unit rotatable about the longitudinal axis of a stanchion, said cam unit comprising in combination:
(a) means for rotatably engaging a segment of the stanchion within said cam unit;
(b) a sleeve of plastic material disposed about at least a part of the engaged segment of the stanchion;
(c) a cam having a pivot axis in alignment with the longitudinal axis of the stanchion for interreacting with said sleeve to selectively restrict rotation of said cam unit relative to the stanchion and about the longitudinal axis of the stanchion;
(d) means for pivotally retaining said cam within said cam unit to restrict relative rotation between said cam unit and the stanchion in a first direction; and
(e) an arm extending from said cam to a point external of said cam unit, said arm being responsive to manipulation for accommodating rotation of said cam unit relative to the stanchion in a second direction.

2. A cam unit rotatable about a stanchion, said cam unit comprising in combination:
(a) means for rotatably engaging a segment of the stanchion within said cam unit;
(b) a sleeve of plastic material disposed about at least a part of the engaged segment of the stanchion;
(c) a first cam for interreacting with said sleeve to selectively restrict rotation of said cam unit relative to the stanchion;
(d) means for pivotally retaining said first cam within said cam unit to restrict relative rotation between said cam unit and the stanchion in a first direction;
(e) an arm extending from said first cam to a point external of said cam unit, said arm being responsive to manipulation for accommodating rotation of said cam unit relative to the stanchion in a second direction;
(f) a second cam for interreacting with said sleeve to selectively restrict rotation of said cam unit relative to the stanchion;
(g) said retaining means including means for retaining said second cam within said cam unit to restrict relative rotation between said cam unit and the stanchion in the second direction; and
(h) a second arm extending from said second cam to a point external of said cam unit, said second arm being responsive to manipulation for accommodating rotation of said cam unit relative to the stanchion in the first direction.

3. The apparatus as set forth in claim 2 including means for restricting movement of each of said arm and said second arm to limit the degree of interference of said cam and said second cam with said sleeve.

4. The apparatus as set forth in claim 3 including means for biasing said arm and said second arm to urge interference of said cam and said second cam with said sleeve.

5. A cam unit rotatable about a stanchion, said cam unit comprising in combination:
(a) means for rotatably engaging a segment of the stanchion within said cam unit;
(b) a cylindrical surface disposed about at least part of the engaged segment of the stanchion;
(c) a first cam for interreacting with said cylindrical surface to selectively restrict rotation of said cam unit relative to the stanchion;
(d) means for pivotally retaining said first cam within said cam unit and the stanchion in a first direction;
(e) a first arm extending from said first cam to a point external of said cam unit, said first arm being responsive to manipulation for accomodating rotation of said cam unit relative to the stanchion in a second direction.
(f) a second can for interreacting with said cylindrical surface to selectively restrict rotation of said cam unit relative to the stanchion;
(g) said retaining means including means for retaining said second cam within said cam unit to restrict relative rotation between said cam unit and the stanchion in the second direction; and
(h) a second arm extending from said second cam to a point external of said cam unit, said second arm being responsive to manipulation for accomodating rotation of said cam unit relative to the stanchion in the first direction.

6. The apparatus as set forth in claim 5 including means for restricting movement of each of said arm and said second arm to limit the degree of interference of said cam and said second cam with said cylindrical surface.

7. The apparatus as set forth in claim 6 wherein said cylindrical surface includes a sleeve of plastic material.

* * * * *